TIME BASE CIRCUITS WITH DYNAMIC BIAS

Filed Nov. 17, 1961

INVENTOR
Eric Davies
BY
Baldwin & Wight
ATTORNEYS

United States Patent Office 3,221,269

Patented Nov. 30, 1965

3,221,269

TIME BASE CIRCUITS WITH DYNAMIC BIAS

Eric Davies, Danbury, England, assignor to The Marconi Company Limited, a British company Filed Nov. 17, 1961, Ser. No. 153,041

Claims priority, application Great Britain, Mar. 28, 1961, 11,328/61

4 Claims. (Cl. 331—111)

This invention relates to time-base circuits and more specifically to time-base circuits of the kind synchronised by incoming timing pulses but which will continue to run freely in the absence of such incoming timing pulses. For the sake of brevity such time-base circuits will be hereinafter referred to as "free-running." The primary application of the invention is to free-running transistor time bases, for which application the invention offers particular advantages, but the said invention is not limited to free-running time bases employing transistors.

Figure 2:
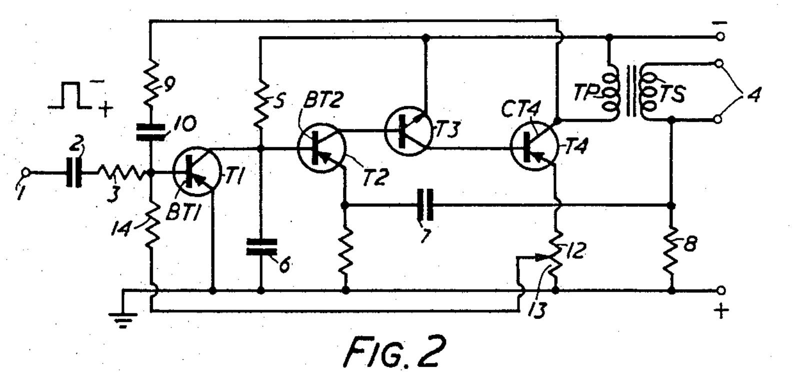
Figure 3:
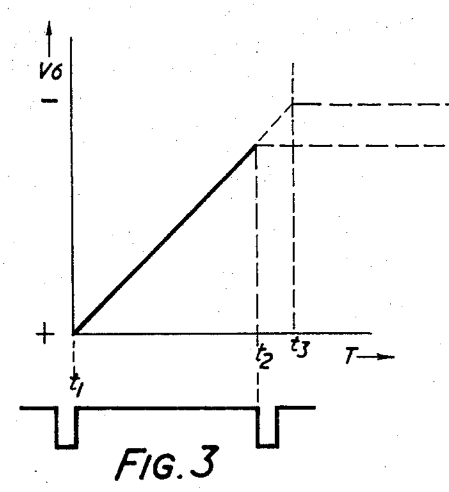
Figure 4:
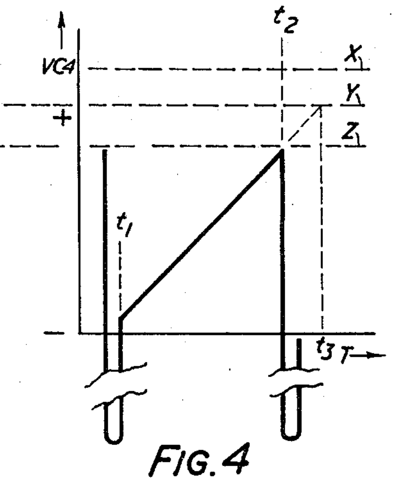

The invention is illustrated in and explained in connection with the accompanying drawings. In the drawings FIGURE 1, which is provided for purposes of explanation, is a diagram of a typical known high-grade free-running transistor time base; FIGURE 2 is a diagram of a preferred embodiment of this invention; and FIGURES 3 and 4 are graphical figures explanatory of the operation of the embodiment of FIGURE 2. Like references denote like parts in FIGURES 1 and 2.

Figure 1:
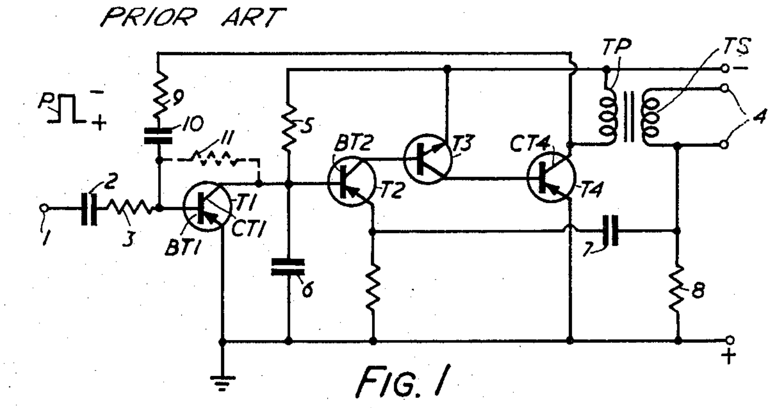

Referring to FIGURE 1, negative going timing pulses as indicated at P are applied at an input terminal 1 through a condenser 2 and resistance 3 to the base BT1 of the first or input stage transistor T1 of a free-running time base circuit comprising four transistors T1, T2, T3 and T4, of which T2, T3 and T4 are in amplifier stages. Output to (for example) one set of the deflection coils (not shown) of a cathode ray television tube is taken at terminals 4 from the collector CT4 of the transistor T4 through a transformer primary TP and a secondary TS. A resistance 5 is connected between the negative supply terminal and the junction point of the collector CT1 of transistor T1 with the base BT2 of the transistor T2, and a condenser 6, connected between the said collector CT1 and earth, acts as a saw tooth condenser to produce saw tooth wave operation in the well known way. The operation of this circuit arrangement will now be described. In the absence of negative going pulses at the base of transistor T1, the latter is not conducting and condenser 6 is being slowly charged toward the potential of the negative supply through resistor 5. The gradually increasing negative voltage of condenser 6 is applied to the base of transistor T2, which is accordingly rendered more and more conductive. The increasing conduction of transistor T2 makes the potential at the base of transistor T3 more positive, thereby causing T3 to become progressively more conductive. The base of transistor T4 is therefore made increasingly negative with the result that the current through transformer primary winding TP increases. Under conditions of synchronised operation, this process is terminated by application of a suitable timing pulse as shown at P to the base of transistor T1 to switch it into conduction and discharge condenser 6. In the free running condition the process is terminated when one of the amplifier stage transistors T2, T3, or T4 becomes saturated. Whenever such saturation occurs, the rate of increase of current at the collector of transistor T4 changes and the negative going pulse which is produced thereby is applied through condenser 10 to the base of transistor T1. The fact that the aforementioned saturation is relied upon for the regenerative process is one of the disadvantages of this type of time base.

In the particular time base circuit of FIGURE 1, linearisation of the saw tooth is obtained by means of a negative feedback network comprising the condenser 7 and the resistance 8. A positive feedback loop including resistance 9 and condenser 10 is provided between the collector CT4 of transistor T4 and the base BT1 of the transistor T1 so that a voltage pulse which occurs when the saw tooth wave current ceases to flow in the primary TP is fed back to the said base BT1 and causes discharge of the saw tooth condenser 6. This expedient of positive feedback of pulses produced at the output to ensure free running of the time base in the absence of input timing pulses has also been widely used in free running time bases using tubes instead of transistors.

The expedient in question as at present practised has the defect of lacking high stability of operation in the free running condition, may result in over driving of the amplifier stages following the first stage (that which, in FIGURE 1, comprises the transistor T1) and, in the case of a transistor time base, may lead to the destruction of transistors if, as may happen, the condenser 6 is charged to the full negative supply voltage. In the case of a silicon transistor at T1, this danger can be minimised by connecting a resistance (shown in broken lines at 11) between its collector CT1 and its base BT1, but this has the defect of decreasing linearity by, in effect, shunting the saw tooth condenser 6. In the case of a germanium transistor at T1, the inherent leakage of the transistor is usually sufficient to make the provision of an additional resistance 11 unnecessary, but the defect of relatively poor linearity is, of course, still present. The present invention seeks to overcome the foregoing defects and disadvantages.

According to this invention a free running time base circuit comprises an input stage, arranged to be controllable as to its state of conductivity by input timing pulses, a condenser connected to be charged and discharged by said input stage in dependence upon its state of conductivity, an amplifier connected to amplify the voltage across said condenser, means for applying voltage pulses produced in an output circuit of said amplifier as positive feed back to the input side of said input stage and means for controlling the bias of said input stage in correspondence with the amplified output in such manner as to prevent the voltage across said condenser from rising above a predetermined amount.

Preferably the input stage and the amplifier are transistor stages, the positive feedback voltage and the timing pulses are applied to the base of the input stage transistor, and bias constituted by the voltage drop in a resistance included in a circuit through which output current from an amplifier transistor stage flows is also applied to the base of the input stage transistor. In the preferred arrangement said resistance is a potentiometer resistance having an adjustable tap which is connected to the base of the input stage transistor.

A preferred embodiment comprises an input stage transistor, means for applying timing pulses to the base thereof, an amplifier consisting of a number of transistor stages with the base of the first amplifier stage transistor connected to an output electrode of the input stage transistor and the base of each succeeding stage connected to an output electrode of the transistor of the immediately preceding stage, an output circuit fed from the transistor of the last amplifier stage, a circuit for applying voltage pulses produced in said output circuit as positive feedback to the base of the input stage transistor, a resistance in said output circuit, and a tap on said resistance connected through a further resistance to the base of the input stage transistor.

Preferably linearising negative feedback is applied to a point in one stage of the free running time base circuit from a point in a subsequent stage thereof.

FIGURE 2, which shows a preferred embodiment of the invention, requires little further evplanation in view of the fact that like references denote like parts in FIGURES 1 and 2. As will be seen, the essential difference between FIGURES 1 and 2 lies in the provision, in the latter figure, of the potentiometer resistance 12 in the output current circuit of the transistor T4 and the connection of the adjustable tap 13 on this resistance to the base BT1 of transistor T1 through resistance 14 so that there is dynamic bias on the said transistor T1 in dependence on the current variation through resistance 12.

Referring to FIGURES 3 and 4, the former shows voltage across condenser 6 (V6) plotted against time T and the latter shows the collector voltage VC4 of transistor T4 also plotted against time. At the end $t_1$ of a timing pulse, the voltage V6 starts to rise and continues to rise substantially linearly until the beginning $t_2$ of the next timing pulse when the condenser discharges. If the said next timing pulse does not arise, the voltage V6 (see FIGURE 3) and the voltage VC4 (see FIGURE 4) both continue to rise—the former negatively and the latter positively—as indicated by the broken lines, but the rise in both cases is automatically limited to a safe value due to the dynamic bias applied to the base of transistor T1 and, at a time $t_3$ the limitation of the saw tooth current which prevents the output current of transistor T4 from continuing to rise linearly causes a voltage pulse which is fed to the base of transistor T1 through elements 9 and 10. Since transistor T1 is thus rendered conductive when transistor T4 is still unsaturated—voltage VC4 (see FIGURE 4) is still below the supply voltage—regeneration takes place at the beginning of the flyback pulse instead of at some more or less indeterminate time later. There is thus the advantage that regeneration speeds up the start of the flyback pulse thus increasing the pulse amplitude applied to the base BT1 and resulting in rapid discharge of the saw tooth condenser 6. Also the amplifier transistors T2, T3 and T4 are never over-driven so that the formation of the pulse on the base BT1 is assured and not dependent on uncontrollable factors as would be the case were transistor T4 allowed to saturate. In FIGURE 4 the horizontal broken line X represents the supply voltage and in FIGURES 3 and 4 the horizontal broken lines Y and Z apply respectively to the free running condition and the synchronised condition of operation.

If T1 is a silicon transistor it cannot conduct until its base is biased negatively with respect to its emitter by a certain voltage—normally about 0.6 volt. The negative bias on this base, when the circuit is operating in the free running condition, can be adjusted by adjusting the position of the tap 13 along the resistance 12. This adjustment therefore gives adjustment of the free running frequency and in normal practice will be set at a value at which the free running frequency is a little below the intended synchronised frequency, i.e. the repetition frequency of the input pulses.

I claim:

1. A free running time base circuit comprising an input stage having an output which presents alternatively a high impedance and a low impedance in accordance with input timing pulses applied thereto; a condenser connected across said output to be discharged when the impedance of the output is low; an amplifier connected to amplify the voltage across said condenser and having an output circuit; means for applying voltage pulses produced in said output circuit as positive feedback to the input side of said input stage; and alternating current connection means for feeding back, from said output circuit to the input side of said input stage, bias control signals at the operating frequency which control the bias of the input stage and prevent the voltage across the condenser from rising above a predetermined level which is below the level at which saturation of the amplifier occurs.

2. A time base circuit as claimed in claim 1 wherein the input stage comprises a transistor having base, collector and emitter electrodes, said base constituting the input of the input stage to which are applied the input timing signals as well as the positive feedback signals and the bias control signals, and said condenser is connected between said emitter and said collector; said amplifier having a plurality of cascaded transistors, the input transistor of which has a base electrode connected to one side of the condenser and an emitter electrode connected through an emitter resistor to the other side of the condenser, the output transistor of the amplifier having a base connected to be fed from the preceding stage and emitter and collector electrodes connected in series in said output circuit which includes time base load means and a series resistor, said bias control signals being taken from the series resistor.

3. A time base circuit as claimed in claim 2 wherein said series resistor is a potentiometer resistance, an adjustable tap of which is connected to the base of the input stage transistor.

4. A time base circuit as claimed in claim 2 wherein negative feedback means are connected between the output of one transistor and the input of a preceding transistor in the circuit to apply linearising negative feedback to said preceding transistor.

References Cited by the Examiner

UNITED STATES PATENTS

| | | | |
|---|---|---|---|
| 2,913,625 | 11/1959 | Finkelstein | 307—88.5 |
| 2,959,745 | 11/1960 | Grieg | 331—113.1 |

OTHER REFERENCES

Army Technical Manual TM 11-690: Basic Theory and Application of Transistors. March 17, 1959. Pages 49, 85, 86. TK 6550 U69.

ROY LAKE, *Primary Examiner.*

JOHN KOMINSKI, *Examiner.*